Jan. 9, 1934.　　　E. W. H. RENNICK　　　1,942,450
LUBRICATOR
Filed Sept. 4, 1930
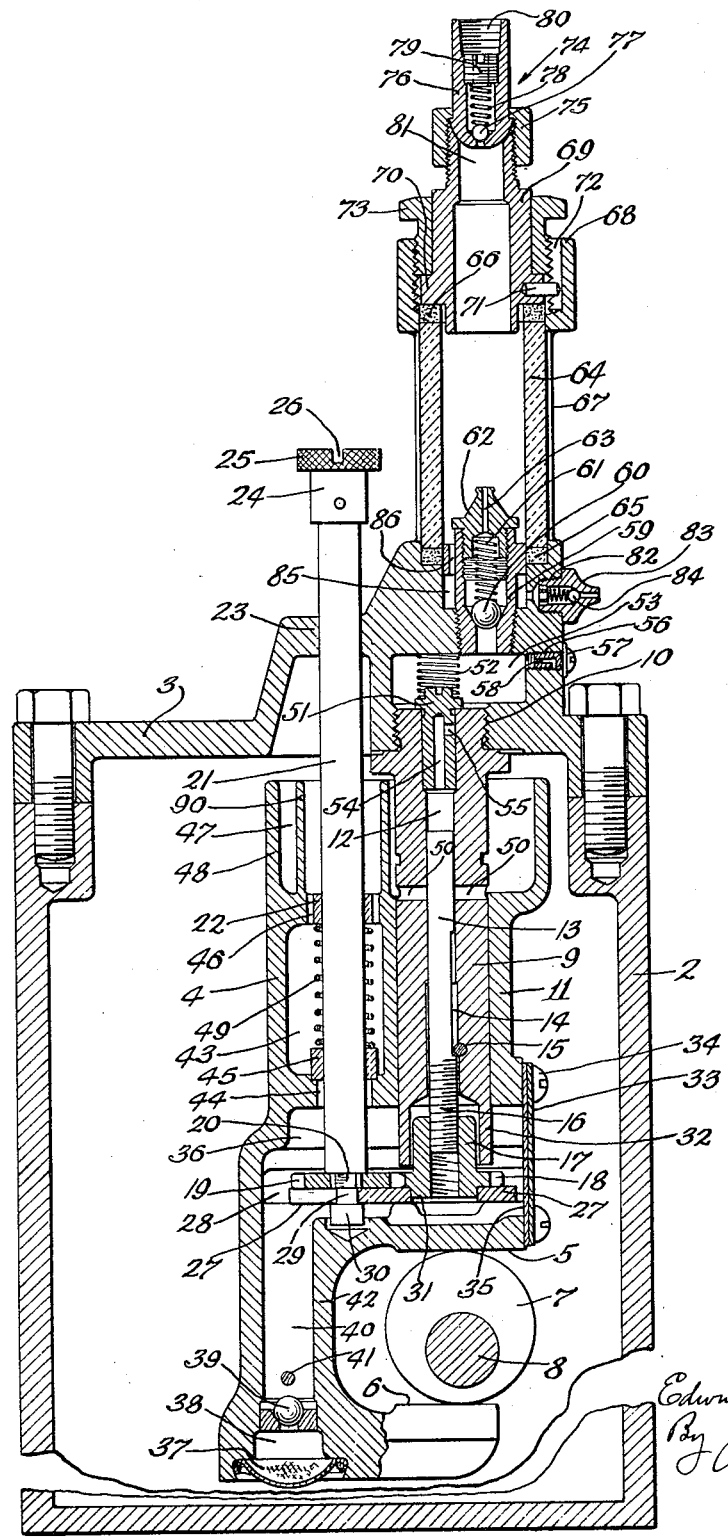
Inventor:
Edwin W. H. Rennick,
By Chas. M. Nissen,
Atty.

Patented Jan. 9, 1934

1,942,450

UNITED STATES PATENT OFFICE 1,942,450

LUBRICATOR

Edwin W. H. Rennick, Fort Wayne, Ind., assignor to S. F. Bowser & Company, Inc., Fort Wayne, Ind., a corporation of Indiana Application September 4, 1930. Serial No. 479,685

14 Claims. (Cl. 184—27)

My invention relates to lubricating apparatus and one of its objects is the provision of improved and efficient pumping mechanism for more efficiently supplying lubricant to a lubricant line.

Another object of the invention is the provision of an auxiliary reservoir in connection with lubricant pumping mechanism to assure continued supply of lubricant for some time after the source of supply needs replenishing.

A further object of the invention is the provision of means in combination with pumping mechanism for eliminating air from the lubricant.

Another object of the invention is the provision of a drop nozzle and means for supplying lubricant thereto, combined with mechanism permitting introduction of a liquid of greater specific gravity than the lubricant into a sight-glass independently of the nozzle so that the lubricant will always be kept out of contact with the interior wall of the sight-glass and the latter therefore always kept clear to maintain visibility of the drops of oil ascending from the nozzle through the liquid in the sight-glass.

A further object of the invention is the provision of improved mechanism for supplying lubricant to a lubricant line, combined with means for maintaining a sight-glass filled with glycerine and the chamber above the same filled with lubricant to prevent the ingress of air while changes and adjustments are being made in the lubricant line.

Another object of the invention is the provision of improved pumping mechanism comprising pumps serially arranged one of relatively large capacity and the other of relatively smaller capacity, combined with means for adjusting the capacity of the smaller pump.

Other objects of the invention will appear hereinafter, the novel features and combinations being set forth in the appended claims.

The accompanying drawing is a sectional elevation of lubricating apparatus embodying my improvements.

The tank 2 is adapted to contain the supply of lubricant. Suspended from the under side of the cover 3 of the tank 2 is the pumping apparatus comprising a head 4 having at its lower portion the cam engaging plates 5 and 6 between which is located the disc 7 eccentrically mounted on the driving shaft 8. The shaft 8 extends through one wall of the tank 2 and is adapted to be driven by a suitable source of power in order to secure rotation of the disc 7 and the vertical reciprocation of the pump head 4.

Rigidly connected to the bottom of the cover 3 is the stationary cylindrical plunger 9. This plunger may be screw-threaded to the bottom of the cover 3 as shown at 10. The plunger 9 is cylindrical on its outer surface to fit into the corresponding cylinder 11 which is integral with the pump head 4.

Concentric with the plunger 9 and slidable vertically in the cylindrical opening 12 therein, is the movable plunger 13. Intermediate the ends of the plunger 13 is a flat portion 14 which is adapted to be engaged by the pin 15 which extends transversely of the fixed plunger 9 and is secured to the latter. The flat portion 14 on the plunger 13 serves as a cut-away portion of sufficient length to permit the maximum amount of vertical reciprocation of the plunger 13 relatively to the plunger 9.

The lower end of the plunger 13 is screw-threaded at 16 for receiving the nut 17, the lower end of which has secured thereto a gear 18. The gear 18 meshes with another gear 19 which is secured by means of the flat portions 20 to the lower end of the rotary adjusting rod 21. The rod 21 extends through a bearing 22 in the pump head 4 and also through a bearing 23 in the cover 3 and the upper end of the rod 21 is provided with an adjusting head 24 which may be provided with a knurled portion 25 to facilitate its being turned and is also provided with a transverse slot 26 so that a screw-driver may be used for turning the rod 21.

The gears 18 and 19 rest on the bearing plate 27. This bearing plate may be secured in the transverse slot or horizontal groove 28 in the lateral walls of the head 4. The lower end of the rod 21 may be provided with an extension 29 journaled in the plate 27 and an enlarged head 30 may be connected to the extension 29 so as to prevent the rod 21 from being pulled upwardly from its position shown. This arrangement will assure the maintenance of the gear 19 in its horizontal position where it will always mesh with the gear 18.

The lower side of the gear 18 is provided with a circular extension 31 which fits into a circular opening in the plate 27. The nut 17 on the upper side of the gear 18 forms a hub fitting into the lower cup-shaped end 32 of the fixed plunger 9.

A removable plate 33 may be secured by means of the screws 34 over an opening in the head 4 with a gasket plate 35 intervening. By removing the plate 33 and the gasket plate 35, the chamber 36 will be open for inspection or repair of the parts located therein.

When the shaft 8 is rotated to effect rotation of the eccentrically mounted disc 7 the head 4 together with the plunger 13 and the rod 21 will be bodily reciprocated vertically. Upon downward movement of the head 4 oil in the tank 2 will pass through the screen 37 into the inlet port 38 and thence past the ball check valve 39 into the vertical passageway 40. The relative upward movement of the ball check valve 39 is limited by the cross-pin 41 which is secured to the hollow leg 42. When the head 4 is reciprocated in an upward direction the ball check valve 39 will close to confine the oil in the passageway 40.

The supply of lubricant in the tank 2 should be sufficient to cause the oil to not only fill the chambers 40 and 36, but also the chamber 43. That is to say, downward movement of the head 4 should also cause the oil to flow upwardly through the passageway 44 past the check valve 45 into the chamber 43 and thence through the vertical openings 46 into the auxiliary reservoir 47 which is in the form of a cup 48 located at the top of the head 4 and preferably integral therewith. The tank 2 should be full when starting operations and when the tank is nearly empty it should be refilled.

When the head 4 moves down the valve 39 is opened and the valve 45 is closed by the spring 49. When the head 4 moves up the valve 39 is automatically closed and the valve 45 is opened. When the head 4 moves down the volume of chambers 40 and 36 increases and when the head 4 moves up the volume decreases. A pumping action is thus obtained.

It should be understood, however, that the immersion of the leg 42 need be only sufficient to cause the oil to flow upwardly past the check valve 39 because after the oil enters the chambers 40 and 36 it is forced from the latter past the check valve 45 by action of the plunger 9 extending into the chamber 36. That is to say, by reason of the reciprocation of the cylinder 11 vertically on the fixed plunger 9, there is a relative movement of the lower end of the plunger 9 into and out of the chamber 36 in synchronism with the reciprocations of the head 4. For instance, when the head 4 is moved down and oil flows upwardly past the check valve 39 into the chamber 40, there is a relative movement of the plunger 9 out of the chamber 36 and therefore a vacuum is produced in the chamber 36 to effect the requisite suction for pumping the oil from the tank 2 into the chamber 40. When the head 4 is moved upwardly and the check valve 39 closes, there is a relative movement of the lower end of the plunger 9 into the chamber 36, thereby displacing the oil therein and forcing it through the passageways 44 and past the check valve 45 into the chamber 43 and thence upwardly into the inner auxiliary cup reservoir 90.

The oil cup or inner auxiliary reservoir 90 is open on its upper side for flow of the oil into the outer oil cup or outer auxiliary reservoir 48. From the latter the oil may overflow into the tank 2. While the inner cup may be omitted, its inclusion in the apparatus shown has the advantage of preventing leakage of oil from the cup 48 through the valves 45 and 39.

The fixed plunger 9 is provided with radial passageways 50, 50 for establishing communication between the auxiliary reservoir 47 and the cylindrical chamber 12 within the plunger 9 when the plunger 13 is at the lower limit of its stroke. The downward movement of the upper end of the plunger 13 is equal to the distance between the center of the shaft 8 and the outermost point of the disc 7. The length of the stroke of the plunger 13 is always the same and it is such that when the plunger 13 is at the lower limit of its stroke the oil may flow freely from the auxiliary reservoir 47 through the passageways 50 into the chamber 12.

While the length of the stroke of the plunger 13 always remains the same, the limits of the stroke of this plunger is adjustable. By turning the rod 21 the nut 17 may be turned to lift or lower the plunger 13 while the pin 15 acting on the flat portion 14 will prevent rotation of the plunger 13. It can readily be seen that the capacity of the pump comprising the plunger 13 may be adjusted by adjusting the upper limit of the stroke of the plunger 13 because the amount of oil pumped by the plunger 13 at each stroke will be determined by the distance from the passageways 50 to the upper limit of the stroke. For instance, by lowering the upper limit, the capacity is decreased.

In the upper end of the fixed plunger 9 is a valve 51 which is held in closed position by the spring 52 located in the chamber 53. The valve 51 is elongated and provided with a vertical passageway 54 which communicates with the lateral port 55 intermediate the ends of the valve.

In the lateral wall of the chamber 53 is a screw-threaded vent opening 56 which is normally closed by the screw-threaded plug 57. When the latter is unscrewed from the exterior of the cover 3 the passageway 58 therein will permit entrapped air in the chamber 53 to escape, provided the shaft 8 is rotating and the pumping mechanism is operating. As soon as oil begins to flow through the passageway 58 the screw-threaded plug 57 is again closed.

Screw-threaded into the top of the cover 3 is a cup 59 in the bottom of which is located a ball check valve 60 held down by the spring 61, the upper end of which engages the bottom of the nozzle 62 which is screw-threaded into the top of the cup 59. When the pumping mechanism is operated, oil will be forced past the check valve 60 into the passageway 63 of the nozzle 62 so as to emerge slowly drop by drop from the latter.

In order that the drops of lubricant may ascend from the drop nozzle and be clearly visible, a sight-glass 64 is provided and filled with glycerine or some other liquid of greater specific gravity than oil so that the drops of oil will ascend through the transparent liquid and be clearly visible through the sight-glass.

The sight-glass 64 may be mounted between gaskets 65 and 66 in the frame 67, the upper end of which is in the form of a screw-threaded cup 68 for receiving the sight-glass holder 69. This sight-glass holder has an enlarged cylindrical portion 70 which rests on top of the gasket 66 and is provided with a pin 71 which fits into a vertical slot 72 on the inner wall of the cup 68. Screw-threaded into the cup 68 is a clamp 73. This clamp fits over the upper cylindrical portion of the sight-glass holder 69. When the clamp 73 is screwed down the holder 69 is kept from turning by the pin 71 extending into the slot 72 of the cup 68 which is at the top of the frame 67. The clamp 73 forces the cylindrical portion 70 of the holder against the gasket 66 and the sight-glass is therefore firmly clamped against both gaskets 65 and 66.

At the top of the holder 69 is mounted a line check valve 74 which is held in place by the union nut 75. The check valve 74 comprises a cup 76 in which is located the ball check valve 77 held down by the spring 78 and the latter held adjustably in place by the screw 79. By means of the screw threads 80 the check valve 74 may be connected to the lubricant line. By reason of the check valve 74 the structure shown in the drawing may be connected to the lubricant line or the latter rearranged or readjusted at 80 without disturbing the condition of the liquid and the lubricant in the sight-glass 64 and the chamber above the same. It should be understood that the sight-glass is filled with glycerine or other liquid of greater specific gravity than oil and that the chamber 81 is continually filled with oil floating on top of such liquid.

In order that the glycerine or other liquid may be introduced into the sight-glass 64 without mixture with the oil or independently of the nozzle 62, I have provided a screw-threaded opening at 82 for receiving the filling connection 83 which is provided with a check valve 84. When a compression gun of the grease gun type is connected to the filling port 83, glycerine may be forced past the check valve 84 into the chamber 85 which surrounds the cup 59 and from this chamber the glycerine may flow through the passageway 86 directly into the sight-glass 64 without any mixture whatever with the oil. It will therefore be seen that inasmuch as no oil is mixed with the glycerine when the latter is introduced into the sight-glass 64, the oil cannot come in contact with the interior wall of the sight-glass 64 tending to cloud the same and lessen the visibility therethrough. In other words, by introducing the glycerine into the sight-glass 64 entirely independently of the flow of oil thereinto, the interior wall of the sight-glass is kept perfectly clean and transparent and therefore maximum visibility of the drops of oil as they ascend through the glycerine will be maintained.

It will thus be seen that placing glycerine into the sight-glass by means of the pressure pump eliminates contamination of the glycerine and prevents oil from coming into contact with the inner wall of the sight-glass. The sight-glass will therefore not become cloudy by reason of the oil and therefore the visibility is maintained and the sight-glass need not be frequently cleaned. It should also be noted that since the oil is of a different color from the glycerine the drops which ascend through the glycerine are clearly visible to the eye at any time.

During the operation of the lubricating apparatus shown, when connected to a lubricant line, the delivery to the latter is positive at all times since more liquid is being pumped into the auxiliary reservoir 47 at each pulsation of the pump than is being forced from the nozzle 62. There are shown two pumping units one to draw the oil from the tank 2 and deliver it into the cylinder formed by the fixed plunger 9 and the other to force the oil into the lubricant line so as to eventually reach the parts to be lubricated. The pump comprising the fixed plunger 9 constitutes a low pressure pump and the pump comprising the movable plunger 13 constitutes a high pressure pump.

Since the oil is pumped by the low pressure pump into the auxiliary reservoir 47, there is afforded a flooded suction or oil seal. By reason of the oil being in this reservoir 47 there is no opportunity for air to get into the high pressure pump or into the lubricator system and therefore the arrangement prevents pumping of air instead of oil. In other words, by reason of the auxiliary reservoir 47 there will be a constant supply of oil in the high pressure plunger 13 and such constant supply prevents the introduction of air to the high pressure pump and therefore the latter is completely sealed with oil at all times. The upper end of the plunger 13 is sealed by the oil in the reservoir 47 and the lower end of the plunger 13 is sealed by the oil in the chamber 36.

Should the oil in the tank 2 become exhausted, the oil in the reservoir 47 can be relied on for some time before the supply of oil to the lubricant line becomes exhausted. Since the feed from the nozzle 62 is small the length of time required to empty the auxiliary reservoir 47 is sufficient to give the operator plenty of time to replenish the oil in the tank 2 after he observes by a gauge glass thereon that it is empty. In other words, even after the operator observes that the tank 2 is empty, the pumping mechanism need not be discontinued because the supply in the auxiliary reservoir 47 will be sufficient to permit continued operation for some time if the feed from the nozzle 62 is slow.

It will also be seen that although the pumping apparatus embodies two separate and distinct pumps, neither one can be removed without disturbing the pumping effect of the other. The pin 15 limits the maximum stroke of the plunger 13 and also assists in keeping the pump assembly together when it is removed from the tank 2. This pin also prevents the plunger 13 from rotating relatively to the head 4 and therefore prevents change of feed adjustments of the high pressure pump. The pumping apparatus is self-contained and may be removed from the tank 2 and the lubricant line since it is detachably connected thereto.

During operation of the pumping apparatus, side thrust is reduced to a minimum since the head 4 has an elongated bearing on the stationary plunger 9. The head 4 is kept from turning by reason of the rod 21 being slidable in a bearing in the cover 3. The side thrust on the plunger 13 is substantially eliminated since it slides axially of the fixed plunger 9 while the head 4 slides on the outer surface of the plunger. In fact the concentric arrangement of the plungers and the elongated sliding bearings afforded therefor, eliminates side thrust on the high pressure plunger 13 and reduces to a minimum the side thrust on the lower pressure plunger 9. The efficiency of the pumping apparatus is therefore maintained and the wear so much reduced that the life of the pumping apparatus is greatly prolonged.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In lubricating mechanism, the combination with means forming a primary pump and a secondary pump of smaller capacity, said means comprising co-operating parts including a part common to both pumps, a part co-operating with the common part to provide the primary pump and another part also co-operating with the common part to provide the secondary pump, said common part being relatively reciprocable with respect to the co-operating parts an overflow cup formed in one of said parts for receiving lubricant from said primary pump and a conduit in the common part for directing a portion of it to said secondary pump while the excess overflows, and means for distributing lubricant from said secondary pump.

2. In lubricating apparatus, the combination with a primary pump, of a secondary pump of smaller capacity, of an overflow cup connecting said pumps and formed in a relatively movable part of one of said pumps, and means for operating both pumps simultaneously.

3. In lubricating apparatus, the combination with a primary pump, of a secondary pump of smaller capacity, two overflow cups one within the other, means for supporting said cups for receiving the lubricant successively for flow from the primary pump to the secondary pump, and means for operating said pumps simultaneously.

4. In lubricating apparatus, a pumping mechanism comprising a stationary plunger, a reciprocatory head receiving the stationary plunger, and a plunger movable with said head within the stationary plunger, means for reciprocating said head and said second-named plunger relatively to said stationary plunger to operate the pumping mechanism, means for adjusting the movable plunger with respect to the head with which it moves whereby to adjust the stroke of said movable plunger with respect to the stationary plunger, and means for directing the lubricant to the parts to be lubricated.

5. In lubricating apparatus, pumping mechanism comprising concentric parts forming a plurality of pumps, said parts including an inner and an outer part and an intermediate part relatively movable both with respect to the inner and outer parts, means for operating said pumping mechanism, and means for directing lubricant therefrom into the lubricant line.

6. In lubricating apparatus, the combination with a double pump serially connected and comprising a stationary plunger and a movable plunger one reciprocable within the other and relatively to each other, of means for operating said pump and means for directing lubricant from the pump into the lubricant line.

7. Pumping mechanism comprising a stationary plunger and a movable plunger reciprocable within the same, the stationary plunger serving as a cylinder for the movable plunger, of a head serving as a cylinder for the stationary plunger and connected to the movable plunger for bodily movement therewith, means for reciprocating said head and said movable plunger, and means for directing the flow effected by such reciprocation.

8. Pumping apparatus comprising concentric plungers one stationary and the other movable, a head reciprocable on said stationary plunger and connected to the movable plunger to reciprocate the latter, means for directing the lubricant to and from a passageway in the stationary plunger, and means for adjusting the movable plunger relative to the stationary plunger.

9. In lubricating apparatus, the combination with pumping mechanism comprising a reciprocatory head, a stationary plunger, and a plunger movable with said head, of means for reciprocating said head and said second-named plunger relatively to said stationary plunger to operate the pumping mechanism, means in said head forming an overflow cup and means for pumping fluid into said overflow cup in response to the relative reciprocation between said head and the stationary plunger.

10. In lubricating apparatus, the combination of means forming a primary and a secondary pump, said means comprising a pair of relatively movable parts, one of said parts having two portions adapted to co-operate with the other part to form separate pumps therewith, means for adjusting one of said portions with respect to the other to control the capacity of one of said pumps, means in one of said portions forming an overflow cup and means for pumping fluid from one of the pumps into the overflow cup and means connecting the overflow cup with the other pump.

11. In lubricating apparatus, the combination with pumping mechanism, of means forming a housing providing an air venting cavity, an opening communicating the center of said cavity with the outer atmosphere, a closure for said opening, means to pump the lubricant into said cavity, said cavity having another opening, a drop nozzle for ejecting lubricant from the cavity, a check valve in said nozzle and opening toward the discharge port thereof and away from the cavity, a sight-glass adapted to be filled with liquid of greater specific gravity than the lubricant, means affording a passageway for the lubricant after passing through the sight-glass, and a check valve in such passageway opening away from the sight-glass but serving to maintain the sight-glass and the space above the same completely filled with said liquid and lubricant.

12. In lubricating apparatus, the combination of means forming a primary pump and a secondary pump, said means including relatively movable parts, one of which comprises two parts, each concentric with and each separately co-operating with the other part to form separate pumps, and means for adjusting one of said portions with respect to the other to control the capacity of the secondary pump.

13. In lubricating apparatus, the combination with pumping mechanism comprising a part forming an annular stationary plunger and a pair of co-operating parts relatively reciprocable with respect to the plunger and arranged one within and one outside of the plunger to form therewith a primary and secondary pump mechanism, and means for adjusting one of said co-operating parts with respect to the other so as to control the capacity of one pumping mechanism relative to the other.

14. In a lubricating apparatus, the combination of means forming a primary pump and a secondary pump, said means comprising co-operating parts including a part common to both pumps, a part concentric with the common part and co-operating therewith to provide the primary pump and another part also concentric with respect to the common part and co-operating therewith to provide the secondary pump, said common part being relatively reciprocable with respect to the co-operating parts, an overflow cup formed in one of said parts for lubricant from said primary pump and a conduit in the common part for directing a portion of the received lubricant to said secondary pump while the excess lubricant overflows and means for distributing lubricant from said secondary pump.

EDWIN W. H. RENNICK.